Patented Mar. 9, 1937

2,073,414

UNITED STATES PATENT OFFICE 2,073,414

PROCESS FOR MANUFACTURING COLORED CELLULOSE-ESTER MATERIAL

Henry Dosne, Mulhouse, Haut-Rhin, France

No Drawing. Application June 20, 1934, Serial No. 731,531. In Germany July 1, 1933

4 Claims. (Cl. 18—54)

In the U. S. patent applications Ser. No. 680,897, filed July 17, 1933 which has become Patent No. 2,041,907, and Ser. No. 723,276, filed April 30, 1934 which has became Patent No. 2,042,393, on the name of the same applicant, there are described two processes for the manufacture of colored cellulose material, consisting in adding to a viscose mass (alkaline solution of sodium cellulose xanthogenate) or to an ammoniacal copper oxide cellulose solution, in any phase before coagulation, an ester-salt of a leuco vat dyestuff or an ester-salt of a body giving by acid oxidation a colored compound, coagulating the mass in the usual way and developing the dyeing during or after the coagulation process by acid oxidation.

These processes apply to aqueous solutions of cellulose, to which the above said ester-salts can be added in form of aqueous solutions without difficulties, that is to say, without the risk of precipitations or decompositions which might adversely affect the further operations.

In this way perfectly homogeneous mixtures are obtained.

Besides the artificial silk deriving from cellulose and resulting from aqueous solutions by coagulation, another artificial fibre may be obtained from cellulose compounds, dissolved in organic solvents. Nitro-cellulose for instance is dissolved in a mixture of alcohol and ether and pressed through small spinning orifices with subsequent coagulation. By ventilation the evaporation of the solvent is accelerated and the previously liquid thread is transformed into artificial yarn. As a rule acetyl-cellulose is dissolved in acetone or in a mixture of acetone and alcohol. Usually this solution is either pressed through the spinning apparatus into the open air or into water or another liquid, suitable for absorption of the solvent and for solidifying the remaining cellulose mass forming a thread.

It is however quite impossible to incorporate into a solution of a cellulose compound in an organic solvent, an aqueous solution of an ester-salt, since such addition would lead to a premature coagulation of the cellulose mass and would consequently render the subsequent spinning operation impossible.

It has now been found that organic solvents for ester salts of leuco-vat-dyestuffs are existing, which themselves show the property to be mixable with the organic solvents such as acetone, alcohol, ether, suitable for dissolving cellulose derivatives. It becomes therefore possible to unite without difficulties the solution of an ester salt in such a solvent with the solution of a cellulose derivative, so as to form a homogeneous and inalterable mixture. Solvents having been found appropriate for dissolving ester-salts are: glycol, glycol-mono-ethylether, glycol diethyl-ether, diethylene-dioxide, pyridine, methylalcohol and others. It has further been found that some ester-salts are even sufficiently soluble in solvents, serving for dissolving the cellulose, such as acetone.

The nature of the ester-salts, especially their alkali salts being the commercial form of this class of bodies, did not allow any conclusion with regard to this problem.

Owing to this discovery, it is possible to combine the production of artificial fibre, such as acetyl-cellulose and other esterified cellulose, nitrocellulose with the simultaneous dyeing of these materials.

The development of dyeing and the other after-treatments required are carried out according to the usual methods.

According to the present process, colored relief effects on other materials, for instance a textile fabric may be produced, by printing the cellulose mass containing an ester-salt on this material, coagulating the cellulose mass and developing the dyeing.

Up to now, only two methods for dyeing the said artificial fibres are known:

(1) Addition of suitable dyestuffs to the solution of the cellulose derivative in an organic solvent, either in form of a solution or in finely divided form, afterwards coagulating the cellulose mass and continuing as usual.

(2) Dyeing of the manufactured finished artificial silk material by means of suitable dyestuffs.

These methods, applied so far, however show a number of disadvantages.

With regard to the first method, it must be considered that only dyestuffs, being sufficiently soluble in the cellulose solvent, can be used. Naturally this involves a considerable limitation in the selection of the dyestuffs and even those apt for this purpose are unsatisfactory with respect to the fastness properties and may suffer from the after-treatments (such as denitration in the case of nitrocellulose etc.). The use of dyestuffs in finely divided form again meets with difficulties, such as blocking of the spinning orifices, deficiency of lustre and solidity of the fibre etc. These processes in practice have become of little value.

The dyeing of these fibres, especially of acetyl-cellulose material according to the method described under (2) also meets with difficulties. This latter material behaves differently, compared with the other artificial fibres. New dyeing processes had to be worked out and new dyestuffs, some of them being rather expensive, had to be found out for achieving a satisfactory result.

Under certain conditions, it is possible to dye acetate silk with vat dyestuffs from the vat, running however the risk of loss of lustre and solidity of the silk. In the case of nitrocellulose the denitration, following the spinning operation, very often may yield a fibre which is not uniform and thus affects adversely the dyeing.

On the contrary, the present process allows the direct production of colored artificial fibres, films etc. with the aid of cellulose esters, such as acetyl-cellulose, nitrocellulose, and ester-salts of leuco vat-dyestuffs or other ester-salts of bodies giving by acid oxidation a colored compound, without meeting with the above mentioned disadvantages or difficulties. The present process allows the dyeing of the cellulose material with all the shades of the scale of colors, with good fastness properties and without prejudice to other properties, such as lustre and solidity.

The new process is illustrated, without being limited, by the following examples:

Example 1

1 gr. of the acid sulphuric acid ester-salt of leucodimethoxydibenzanthrone is dissolved in 20 ccm. of the diethyl-ether of glycol. This solution is filtered and well mixed with 250 grs. of a solution prepared with 1 part of acetyl-cellulose, 4 parts of acetone and 1 part of alcohol of 95%. The homogeneous mass obtained is spun as usual, f. i. pressed through the spinning apparatus into air. With the aid of good circulation of air, the solvent is evaporated quickly. The threads thus produced are rinsed in water and in order do develop the dyeing afterwards treated at ordinary temperature in a bath containing 4 grs. of sodium nitrite, 36 grs. of sulphuric acid of 66° Bé. and 10 ccm. of a solution of ammonium vanadate (1%) per liter. The dyed threads are rinsed again and finally dried in the usual way. Acetyl-cellulose threads homogeneously dyed, of a fast green shade are thus obtained.

Example 2

0.5 gr. of the acid sulphuric acid ester-salt of leuco-4:4'- dimethyl - 6:6'-dichlorothioindigo are dissolved in 10 ccm. of acetone and 5 ccm. of the diethyl-ether of glycol. This solution is filtered and well mixed with 250 grs. of an acetyl-cellulose (prepared as indicated in Example 1). The homogeneous mass is spread in form of a thin layer on a glass plate, whereby the solvent evaporates. The film thus obtained is detached from the plate and well rinsed. The development of the dyeing proceeds in a bath of the same composition as indicated in Example 1 at a temperature of 30–40° C. A pink colored, perfectly clear and transparent film is obtained.

Example 3

1 gr. of the acid sulphuric acid ester-salt of leucodibenzpyrenequinone is dissolved in 20 ccm. of the diethyl-ether of glycol. After filtration, this solution is well mixed with 200 grs. of a solution of acetyl-cellulose.

In a similar manner a mixture of a solution of 0.5 gr. of the ester-salt of leucotetrabromindigo, 10 ccm. of acetone and 200 grs. of a solution of acetyl-cellulose is prepared.

These two mixtures are applied on thin cotton-fabric in form of designs, ornamentations and the solvent is evaporated at the open air. Afterwards the dyeing is developed at 50° C. in a bath containing per liter 4 grs. of sodium nitrite 36 grs. of sulphuric acid of 66° Bé. and 10 ccm. of a solution of ammonium vanadate (1%). In this manner yellow and blue relief effects on the cotton are produced.

Example 4

0.5 gr. of the acid sulphuric acid ester-salt of leucodimethoxydibenzanthrone is dissolved in 20 ccm. of the diethyl-ether of glycol. This solution is filtered and thoroughly mixed with a solution of nitrocellulose in alcohol and ether. The homogeneous mass is spread in form of a thin layer on a glass plate and exposed to a current of air, whereby the solvent is evaporated. The film is detached from the plate and well rinsed in water. Already during coagulation the development of dyeing on account of the nitro-groups of the nitrocellulose partly takes place. The development is completed as indicated in Example 1.

The dyed film is rinsed again and for denitration finally treated at 40° C. in a bath containing 5% of sodium sulphydrate, until it becomes perfectly transparent and supple. Thereupon it is thoroughly rinsed and dried. The film produced and dyed homogeneously fast green, shows the well known valuable qualities of the regenerated cellulose.

Instead of the diethyl-ester of glycol, glycol itself, the mono-ethyl-ester of glycol or diethylene-dioxide may be used as solvents for the ester-salts with the same effect.

What I claim is:—

1. A process for producing colored cellulose-ester material, which consists in incorporating into a solution of a cellulose-ester in any of the usual organic solvents an ester-salt of a leuco-vat-dyestuff, the same being first dissolved in an organic solvent completely miscible with the cellulose-ester solution, thereupon mixing such solution with the cellulose-ester solution so as to obtain a homogeneous mass, performing coagulation and the usual after-treatments and developing the dyeing on the regenerated cellulose-ester material by acid oxidation.

2. A process for producing colored cellulose-ester material, which consists in incorporating into a solution of a cellulose-ester in any of the usual organic solvents an ester-salt of a leuco-vat-dyestuff, by dissolving same first in glycol-di-ethylether, mixing the thus obtained solution with the cellulose-ester solution, performing coagulation of the homogeneous mass thus obtained and the usual after-treatments in known manner and developing the dyeing on the regenerated cellulose-ester material by acid oxidation.

3. A process for producing colored cellulose-ester material, which consists in incorporating into a solution of acetyl-cellulose in acetone an ester-salt of a leuco-vat-dyestuff, by dissolving same first in glycol-di-ethylether, mixing the thus obtained solution with the acetyl-cellulose solution, performing coagulation of the homogeneous mass thus obtained and the usual after-treatments in known manner and developing the dyeing on the regenerated cellulose-ester material by acid oxidation.

4. A process for producing colored cellulose-ester material, which consists in incorporating into a solution of acetyl-cellulose in acetone the ester-salt of leuco - dimethoxy - dibenzanthrone by dissolving same first in glycol-di-ethylether, mixing the thus obtained solution with the solution of acetyl-cellulose in acetone, performing coagulation of the homogeneous mass thus obtained and the usual after-treatments in known manner and developing the dyeing on the regenerated cellulose-ester material by acid oxidation.

HENRY DOSNE.